(12) United States Patent
Lo et al.

(10) Patent No.: US 8,713,066 B1
(45) Date of Patent: Apr. 29, 2014

(54) MANAGING WEAR LEVELING AND GARBAGE COLLECTION OPERATIONS IN A SOLID-STATE MEMORY USING LINKED LISTS

(75) Inventors: Jerry Lo, San Gabriel, CA (US); Lan D. Phan, Laguna Hills, CA (US); Cliff Pajaro, Costa Mesa, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 559 days.

(21) Appl. No.: 12/749,329

(22) Filed: Mar. 29, 2010

(51) Int. Cl.
*G06F 17/30* (2006.01)
*G06F 12/00* (2006.01)

(52) U.S. Cl.
USPC ........... 707/800; 707/824; 707/673; 707/722; 707/726; 711/103; 711/158; 711/159; 711/170; 711/154

(58) Field of Classification Search
USPC .......... 707/800, 673, 722, 726, 824; 711/103, 711/158, 159, 170, 154
See application file for complete search history.

(56) References Cited

U.S. PATENT DOCUMENTS

| | | | |
|---|---|---|---|
| 6,230,233 B1 | 5/2001 | Lofgren et al. | |
| 6,594,183 B1 | 7/2003 | Lofgren et al. | |
| 6,850,443 B2 | 2/2005 | Lofgren et al. | |
| 7,353,325 B2 | 4/2008 | Lofgren et al. | |
| 2007/0294490 A1* | 12/2007 | Freitas et al. | 711/154 |
| 2008/0239811 A1 | 10/2008 | Tanaka | |
| 2009/0077429 A1 | 3/2009 | Yim et al. | |
| 2009/0089485 A1 | 4/2009 | Yeh | |
| 2009/0113112 A1 | 4/2009 | Ye et al. | |
| 2009/0157952 A1 | 6/2009 | Kim et al. | |
| 2009/0182936 A1 | 7/2009 | Lee | |
| 2009/0216936 A1 | 8/2009 | Chu et al. | |
| 2009/0240873 A1 | 9/2009 | Yu et al. | |
| 2009/0327591 A1* | 12/2009 | Moshayedi | 711/103 |
| 2010/0082919 A1* | 4/2010 | Chen et al. | 711/161 |
| 2010/0318719 A1* | 12/2010 | Keays et al. | 711/103 |
| 2011/0106804 A1* | 5/2011 | Keeler et al. | 707/737 |
| 2011/0238888 A1* | 9/2011 | Chiu et al. | 711/103 |
| 2012/0239853 A1* | 9/2012 | Moshayedi | 711/103 |

OTHER PUBLICATIONS

"NAND Evolution and its Effects on Solid State Drive (SSD) Useable Life", Western Digital White Paper WP-001-01R, downloaded from http://www.wdc.com/WDProducts/SSD/whitepapersien/NAND_Evolution_0812.pdf, on Mar. 29, 2010, 16 pages.

"Eliminating Unscheduled Downtime by Forecasting Useable Life / SiliconDrive SiSMART Technology", Western Digital White Paper WP-008-06R, downloaded from http://www.wdc.com/WDProducts/SSD/whitepapers/en/SiliconDrive_SiSMART.pdf, on Mar. 29, 2010, 8 pages.

* cited by examiner

*Primary Examiner* — Hong Kim

(57) ABSTRACT

Embodiments of the invention provide a storage subsystem comprising a non-volatile solid-state memory array and a system operation module for managing memory operations. The system operation module is configured to store system operation data in a data structure that includes linked lists for storing system operation data, with at least some lists including entries referencing blocks in the solid-state memory array belonging to a category. The system operation module is further configured to (1) move a particular entry from a first linked list to a second linked list when a block referenced by the particular entry in the first linked list has met a condition for being classified in a new category that is different from that of the blocks referenced by entries in the first linked list, and (2) update entries within the first and second linked lists so that the dependencies in the linked lists are maintained.

24 Claims, 10 Drawing Sheets

| WEAR LEVEL CATEGORY | HEAD |
|---|---|
| A (preferred) | 1 |
| B | 0 |
| C | 7 |

| BLOCK ADDRESS | WEAR LEVEL CATEGORY | PREV | NEXT |
|---|---|---|---|
| 0 | B | 2 | 3 |
| 1 | A | 6 | 4 |
| 2 | B | 3 | 0 |
| 3 | B | 0 | 2 |
| 4 | A | 1 | 5 |
| 5 | A | 4 | 6 |
| 6 | A | 5 | 1 |
| 7 | C | 7 | 7 |

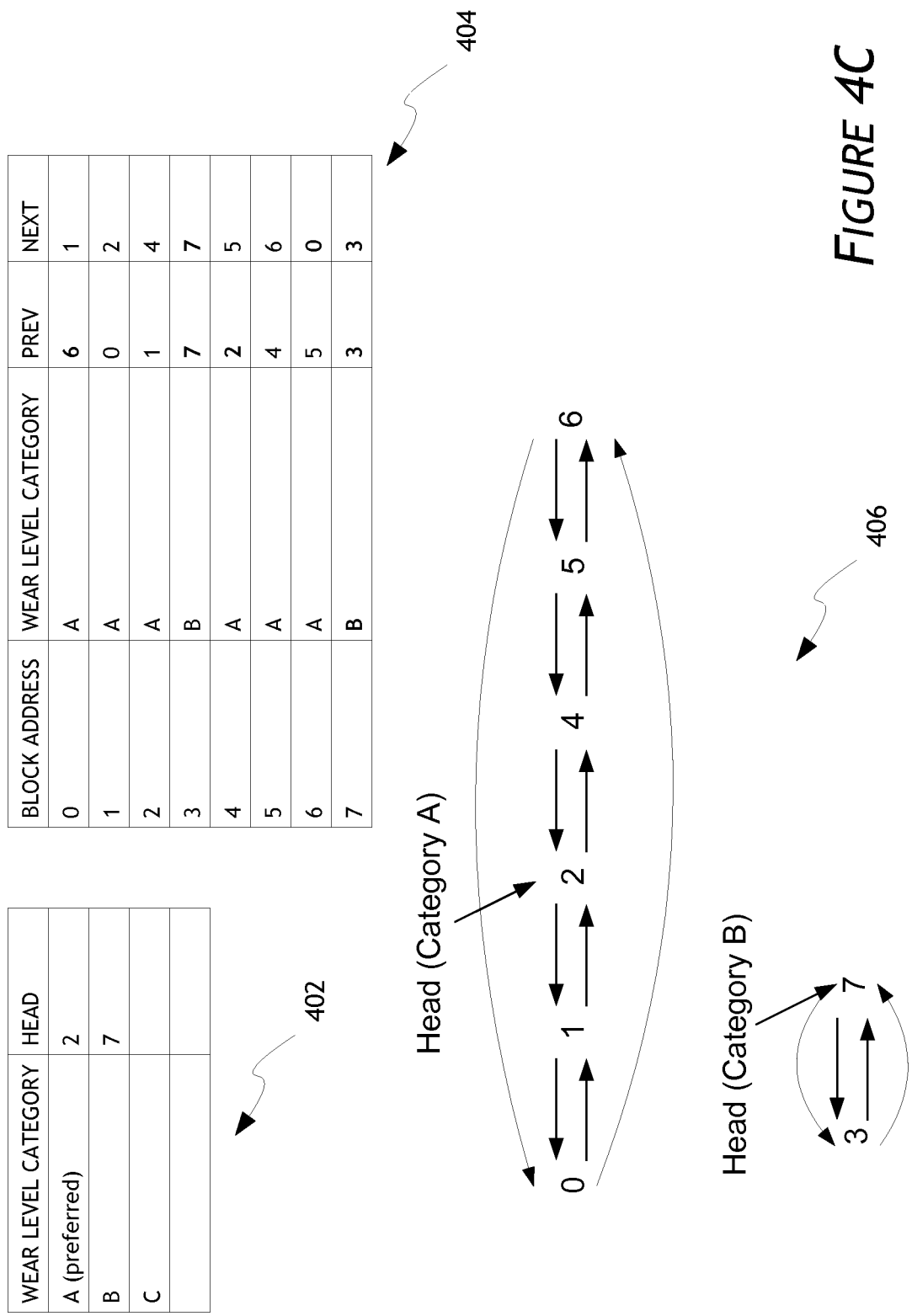

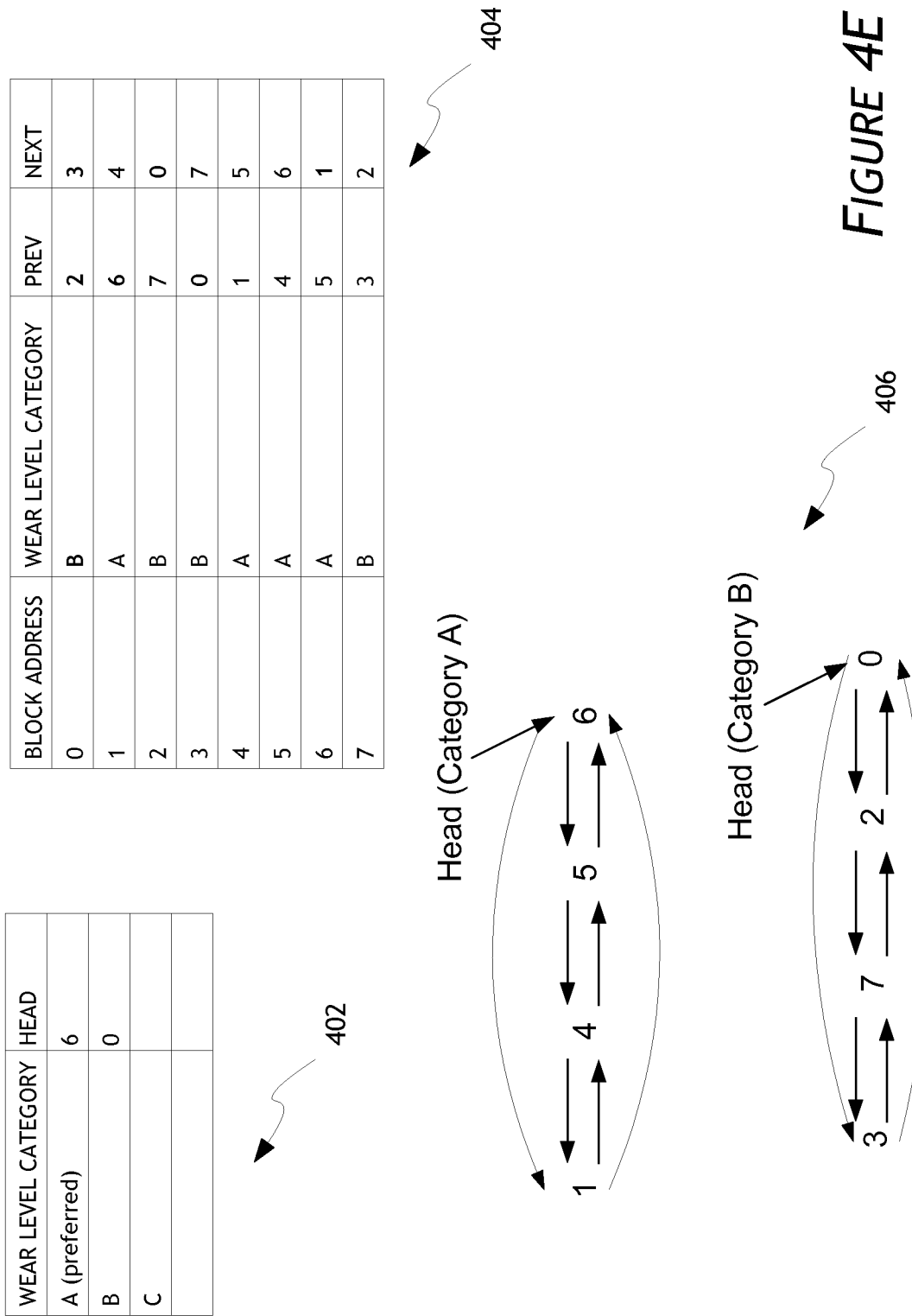

MANAGING WEAR LEVELING AND GARBAGE COLLECTION OPERATIONS IN A SOLID-STATE MEMORY USING LINKED LISTS

BACKGROUND

Solid-state storage subsystems maintain certain operation data in the course of their normal operations. For example, wear leveling is commonly used in Solid State Drives (SSDs) to prolong their lifecycle. Operations such as wear leveling often maintain data in order to determine where upcoming operations should be performed to ensure a uniform application across the entire storage subsystem.

BRIEF DESCRIPTION OF THE DRAWINGS

Systems and methods which embody the various features of the invention will now be described with reference to the following drawings, in which:

FIGS. 4A-4F illustrate the operation of an example set of linked lists for tracking wear level data according to one embodiment.

DETAILED DESCRIPTION OF THE PREFERRED EMBODIMENTS

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

Wear leveling, when performed in a uniform manner, slows down SSD performance because the wear leveling typically requires the SSD to scan/search for a less-used/less-worn block to share the wear across multiple blocks. Such a scan/search may require $O(n)$ time or $O(\log n)$ time per operation, and the amount of scan/search time may change depending on the worn state of the SSD. As such, the scan/search process constitutes a substantial overhead in the operation of an SSD.

Some embodiments of the invention provide systems and methods for performing wear leveling that reduce or eliminate the requirement to perform searching or traversing, whether it is sequential or tree-based. By using a plurality of linked lists to track the wear level of the blocks, the wear leveling operations may be performed in less time, regardless of the state of the storage subsystem. In one embodiment, the wear leveling is performed in $O(1)$ time versus the $O(n)$ time or $O(\log n)$ time required in wear leveling operations that require searching. As wear leveling is constantly performed, this performance gain leads to an improved overall performance of the storage subsystem. In other embodiments, the linked lists are used to track data of other system operations such as garbage collection.

System Overview

Figure 1:
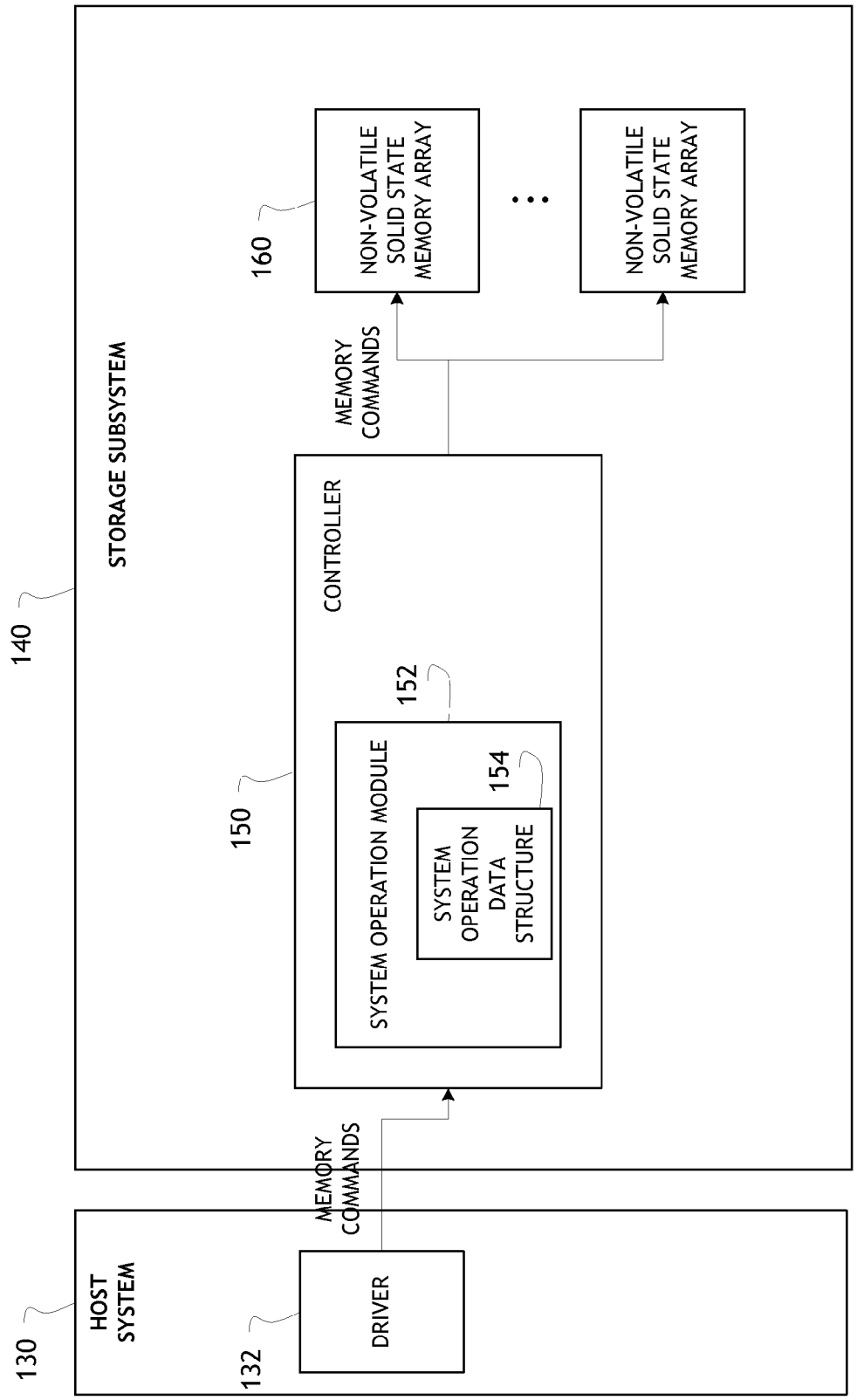
FIG. 1 is a block diagram illustrating a storage subsystem according to one embodiment.

FIG. 1A is a block diagram illustrating a storage subsystem embodiment. As shown, a storage subsystem 140 includes a controller 150, which in turn includes a system operation module 152. In one embodiment, the controller 150 receives memory commands from a driver 132 residing within a host system 130 and from the system operation module 152 and executes the commands in one or more non-volatile solid-state memory arrays 160. The memory commands from the driver 132 may include write and read commands issued by the host system, while memory commands from the system operation module 152 may include memory commands used to perform data maintenance and internal system operations such as wear leveling and garbage collection.

In one embodiment, the system operation module 152 includes a system operation data structure 154 to maintain data that is needed to for system operations. For example, the data structure 154 may maintain statistical and reference data on the status of the non-volatile solid-state memory arrays, including wear level data for individual memory blocks within the arrays. In operation, the system operation module 152 consults the data structure 154 when it performs system operations on the arrays. In other embodiments, the data structure 154 is used by the controller 150 as well.

Figure 2:
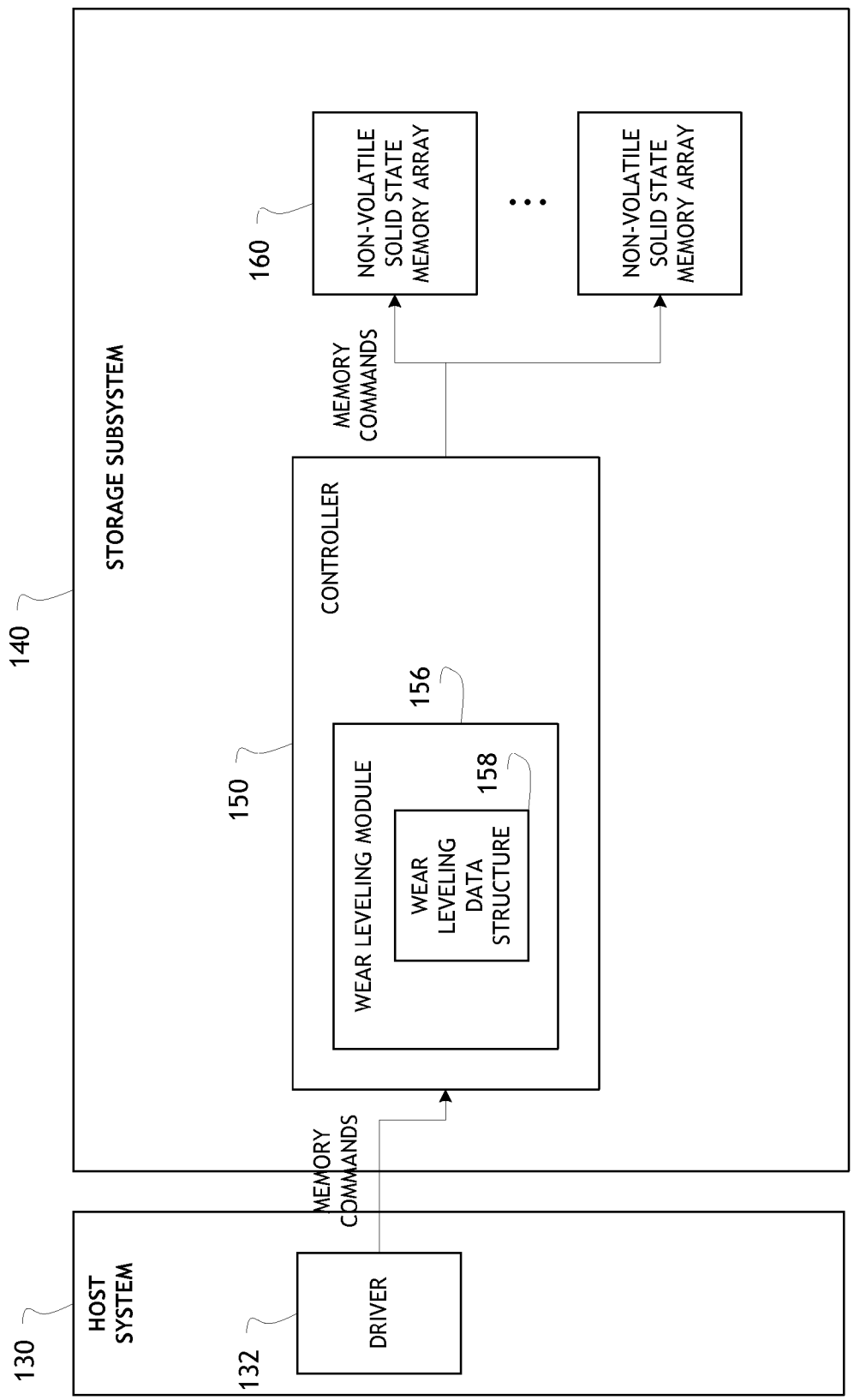
FIG. 2 is a block diagram illustrating a storage subsystem according to another embodiment.

FIG. 2 is a block diagram illustrating a storage subsystem according to another embodiment. In this embodiment, the controller 150 is shown as including a wear leveling module 156 that manages the wear leveling operations the controller performs on the arrays 160. In other embodiments, the wear leveling module 156 performs wear leveling operations on the arrays 160 directly. The wear leveling module 156 maintains a wear leveling data structure 158 to optimize the wear leveling operations. The configuration and operation of other components shown in FIG. 2 remain substantially the same as those shown in FIG. 1.

Using Linked Lists for Wear Leveling

Figure 3A:
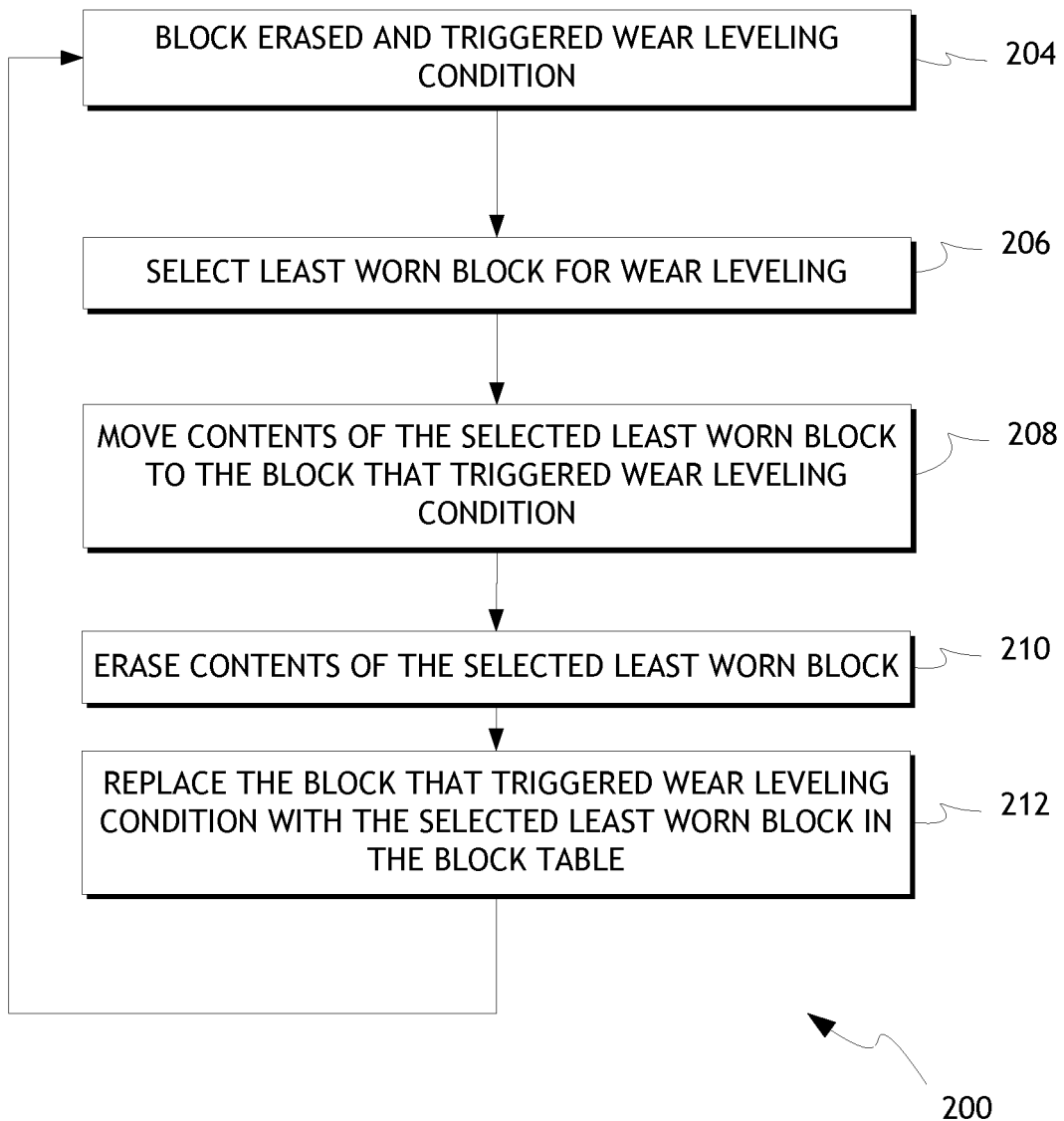
FIG. 3A is a flow diagram illustrating a method for wear leveling in a solid-state storage subsystem according to one embodiment.

FIG. 3A is a flow diagram illustrating a method 200 for wear leveling in a solid-state storage subsystem according to one embodiment. In box 204, the method begins when a block is erased and the erase triggered a wear leveling condition. In box 206, the method selects a least worn block for wear leveling. In one embodiment, a least worn block is preferably selected in the wear leveling to replace the block that was erased in box 204. In box 208, the method moves contents of the selected least worn block to the block that triggered the wear leveling condition in box 204. For example, if a block "A" was erased and triggered the wear leveling condition in box 204, the contents of a selected least worn block "B" would be copied to block "A." In box 210, the method erases the contents of the selected least worn block (block "B" in the example). Finally, the method replaces the block that the triggered wear leveling condition (block "A") with the selected least worn block (block "B") in the block table.

Figure 3B:
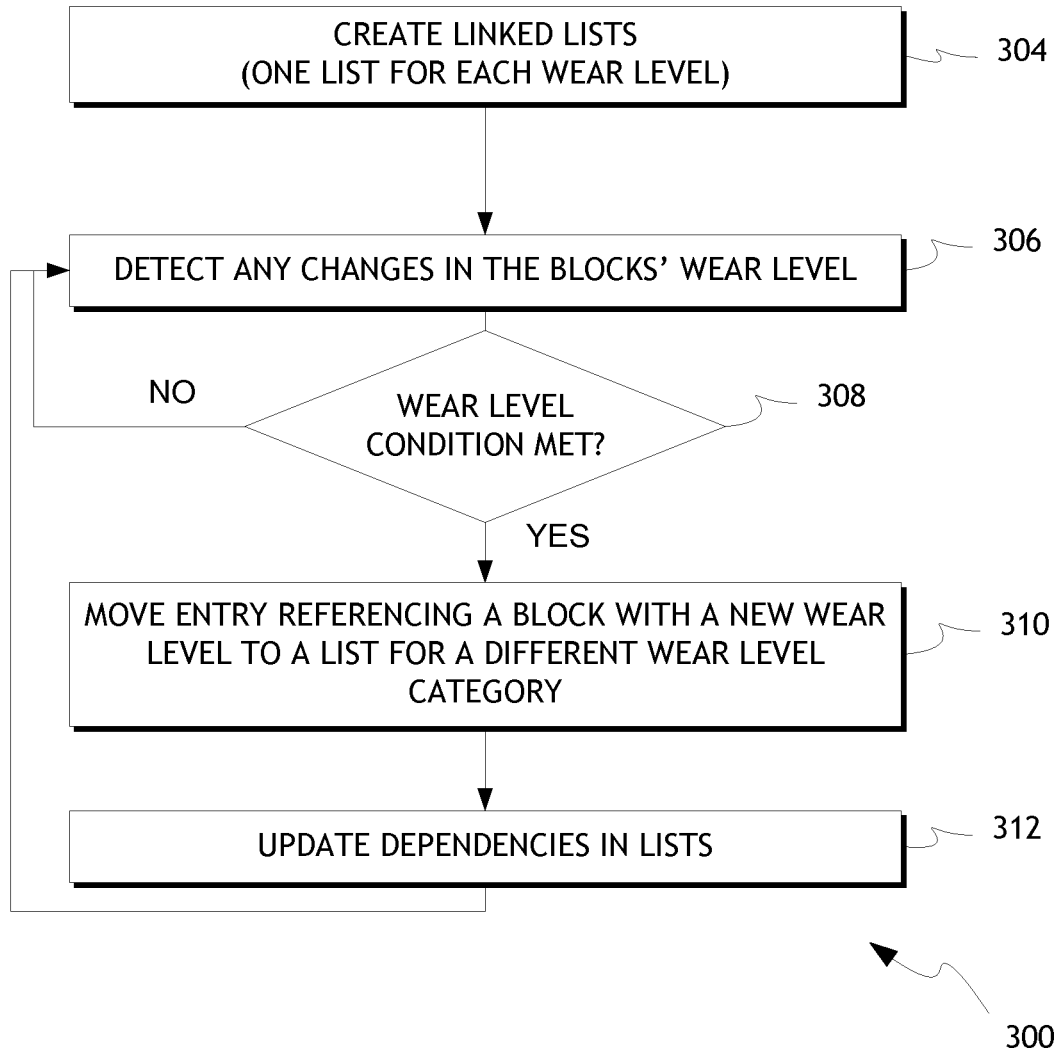
FIG. 3B is a flow diagram illustrating a method for maintaining a data structure for wear leveling according to one embodiment.

FIG. 3B is a flow diagram illustrating a method 300 for maintaining linked list data structures for storing wear leveling data according to one embodiment. In box 304, the method creates a number of linked lists to track memory blocks with various wear levels, with one list designated for each wear level. In box 306, the method detects changes in the wear level of the memory blocks. In box 308, the method determines if a wear level condition is met. In one embodiment, the wear level condition is met when a block's wear level has crossed a minimum wear level threshold such that the block should be placed in a different linked list. In one embodiment, the wear level of a block is a composite rating based on an erase count and an erase time of the block (the amount of time needed to execute an erase operation on the block). In another embodiment, the wear level is based on an erase count or an erase time. In yet another embodiment, the wear level of a block takes into account the error correcting codes (ECC) of the block.

If the wear level condition is deemed to be met, the method in box 310 moves an entry referencing the block from its original assigned linked list to a different linked list for a different wear level category. The new wear level category may be a higher wear level category in one embodiment. Then in box 312, the method updates the dependencies in the linked lists to reflect the change in the entry's location from one list to another. In one embodiment, the updating of the dependencies includes moving pointer references on the list from which the entry is removed and the list to which the entry is added. The process of moving an entry and updating dependencies on the lists will be further illustrated below in conjunction with FIGS. 4A-4F. On the other hand, if the wear level condition is not deemed to be met at box 308, the method returns to box 306 to continue monitoring.

Figure 4A:
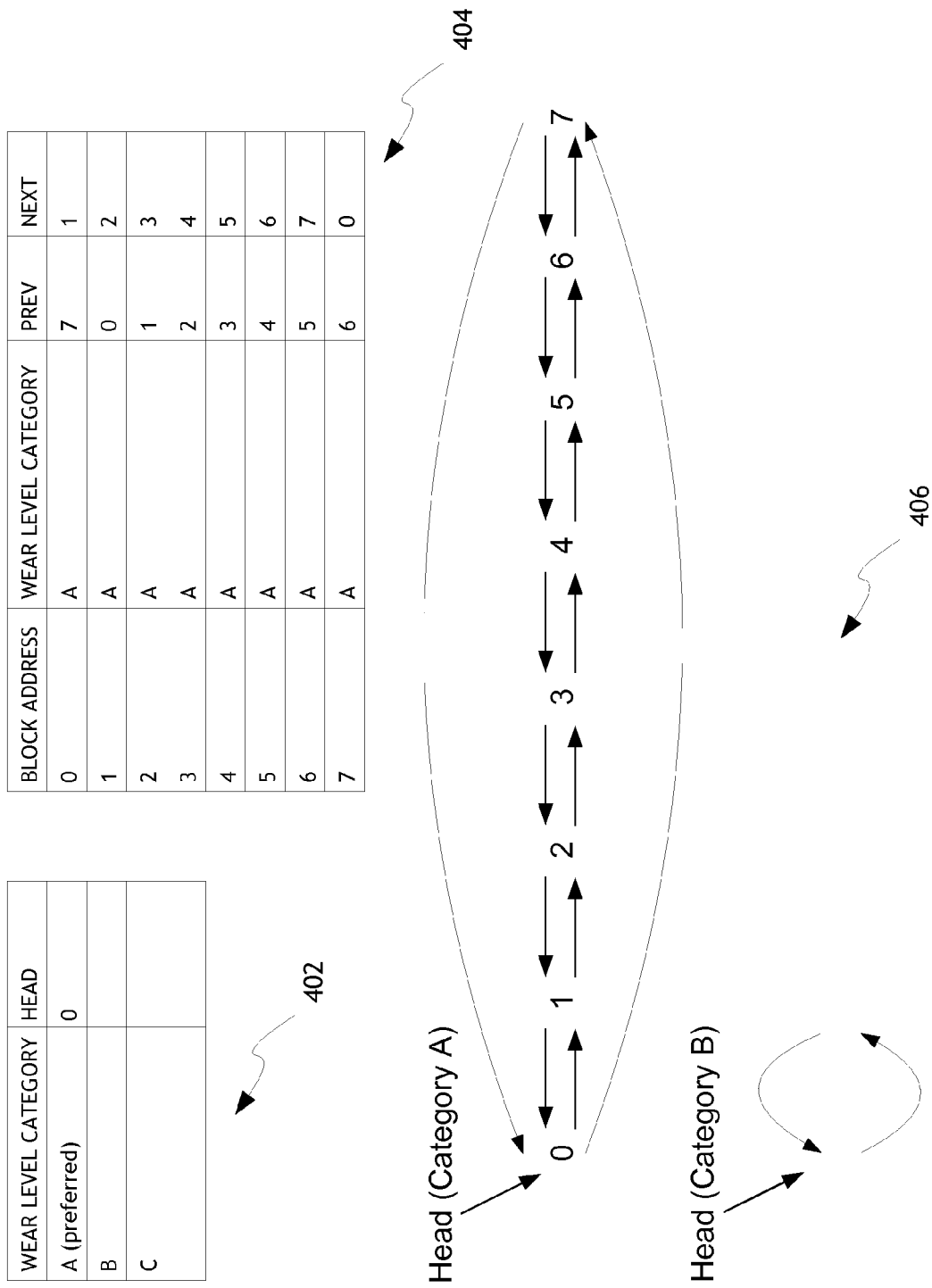

FIGS. 4A-4F illustrate an example of maintaining and updating a plurality of linked lists of entries that track the wear level of memory blocks according to one embodiment. FIG. 4A illustrates the linked link data structures 402, 404, and 406 maintained by the wear leveling module 156 and/or the controller 150 in one embodiment. In one embodiment, one or more data structures 404, 404, 406 form the wear leveling data structure 158 shown in FIG. 2. In one embodiment, the linked lists are doubly-linked lists and they are stored in one or more tables such as that shown in tables 402 and 404. This enables immediate and direct access to information about any block on the lists.

Tables 402 and 404 are provided in FIG. 4A to illustrate the movement of entries from one linked list to another. Table 402 lists the three example wear level categories that are being maintained in this example. There are three linked lists maintained for the three categories "A", "B," and "C," though the Category C linked list is not shown in FIG. 4A. In this example and in one embodiment, the categories reflect different wear levels, with Category A denoting the lowest wear level, Category B denoting the next wear level that is higher than Category A, and Category C denoting the next wear level that is higher than Category B. Category A is also denoted as the "preferred" category. In one embodiment, the wear leveling module 156 is configured to select, for the next wear leveling operation, the block referenced by the head pointer in the preferred category. Thus, in this example, the next block to be selected for wear leveling will be Block 0, since it is the head of Category A, the preferred category. In other embodiments, the linked lists are ranked by wear level category (from least wear to most wear) and the wear leveling module 156 is configured to select a block referenced by the head of a non-empty linked list with the lowest wear level category. In other embodiments, the categories are used to track other system operation data, such as the amount of invalid pages within blocks for garbage collection purposes.

As also shown, the linked list for Category A includes eight entries with pointer references pointing to other entries on the list. Each entry references a block (by block address) in memory. As shown in table 404, each entry has a "previous" pointer pointing to a previous entry on the linked list and a "next" pointer pointing to a next entry on the linked list. For example, the entry for Block 4 has a previous pointer to the entry for Block 3 and a next pointer to the entry for Block 5.

Since FIG. 4A illustrates an initial state, the blocks all have the same wear level category (Category A). For the sake of simplicity, the entries for the blocks will be referred to by their block numbers below.

Figure 4B:
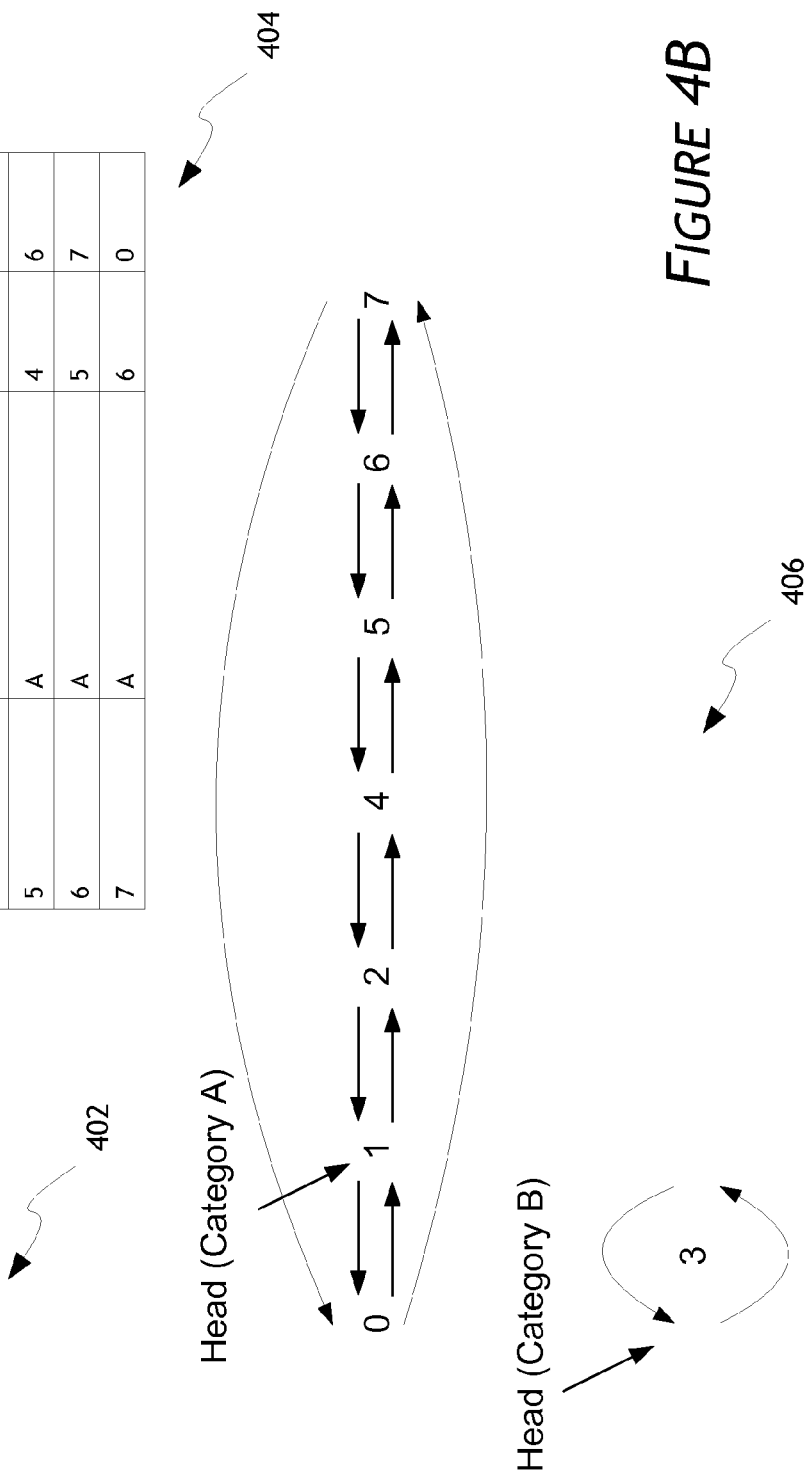

FIG. 4B shows the first movement of an entry as Block 3 becomes worn due to a recent erase operation and becomes eligible for the next wear level category. Block 3 is moved to Category B and becomes the head of Category B. As previously shown in FIG. 3A, a least worn block needs to be selected in this situation because the change in Block 3's wear level requires a wear leveling operation (i.e., Block 3 triggered a wear level condition). Block 0 is selected for the wear leveling because it is the head of the preferred category, Category A. In one embodiment, as the linked lists are stored as data tables, the selection of Block 0 as the least worn block is a table look up requiring O(1) or constant time with no searching or traversing. After Block 0 is used in the wear leveling, the head of Category A becomes Block 1. As shown in table 404, the pointers are updated to reflect the movements.

FIG. 4C shows additional movements as Block 7 becomes worn due to a recent erase operation and becomes eligible for the next wear level category. Block 7 is thus moved to Category B. In one embodiment, a block that is newly promoted to a category linked list becomes the head. Block 7 becomes the head of the Category B linked list. Block 1 is selected as the least worn block for the wear leveling because it is the head of the preferred category, Category A. After Block 1 is used in the wear leveling, the head of Category A becomes Block 2. As shown in table 404, the pointers in Categories A and B are updated to reflect the movements. Although the head pointers are shown to move from left to right down the linked lists during an update operation, in other embodiments the head pointers are moved from right to left.

Figure 4D:
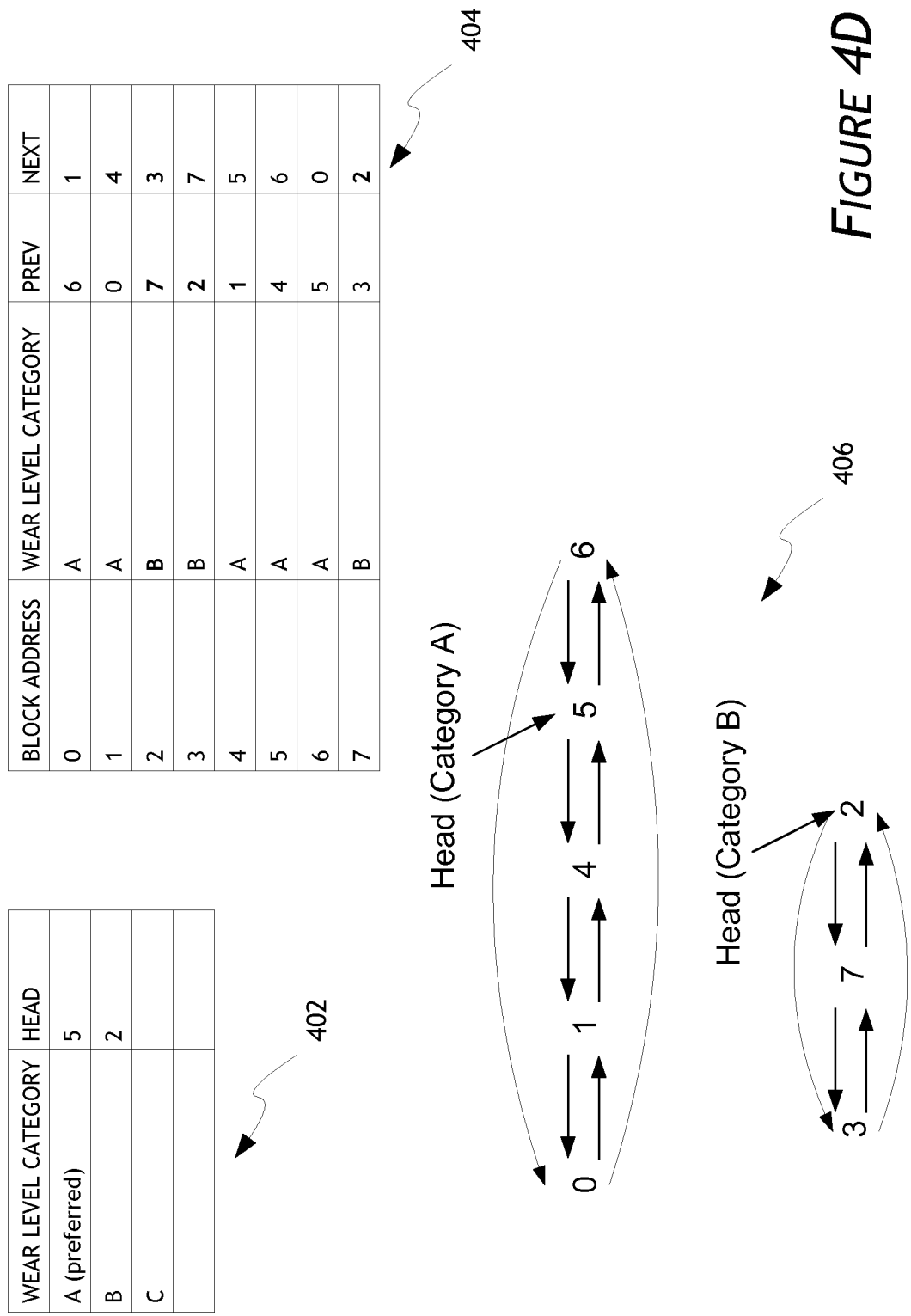

FIG. 4D shows the next additional movements as Block 2 becomes worn due to a recent erase operation and becomes eligible for the next wear level category. Block 2 is moved to Category B and becomes its new head. Subsequently, Block 4 is used in the wear leveling so the head of Category A becomes Block 5. As shown in table 404, the pointers in Categories A and B are updated to reflect the movements.

FIG. 4E shows the next additional movements as Block 0 becomes worn due to a recent erase operation and becomes eligible for the next wear level category. Block 0 is moved to Category B and becomes its new head. Subsequently, Block 5 is used in the wear leveling so the head of Category A becomes Block 6. As shown in table 404, the pointers in Categories A and B are updated to reflect the movements.

Figure 4F:
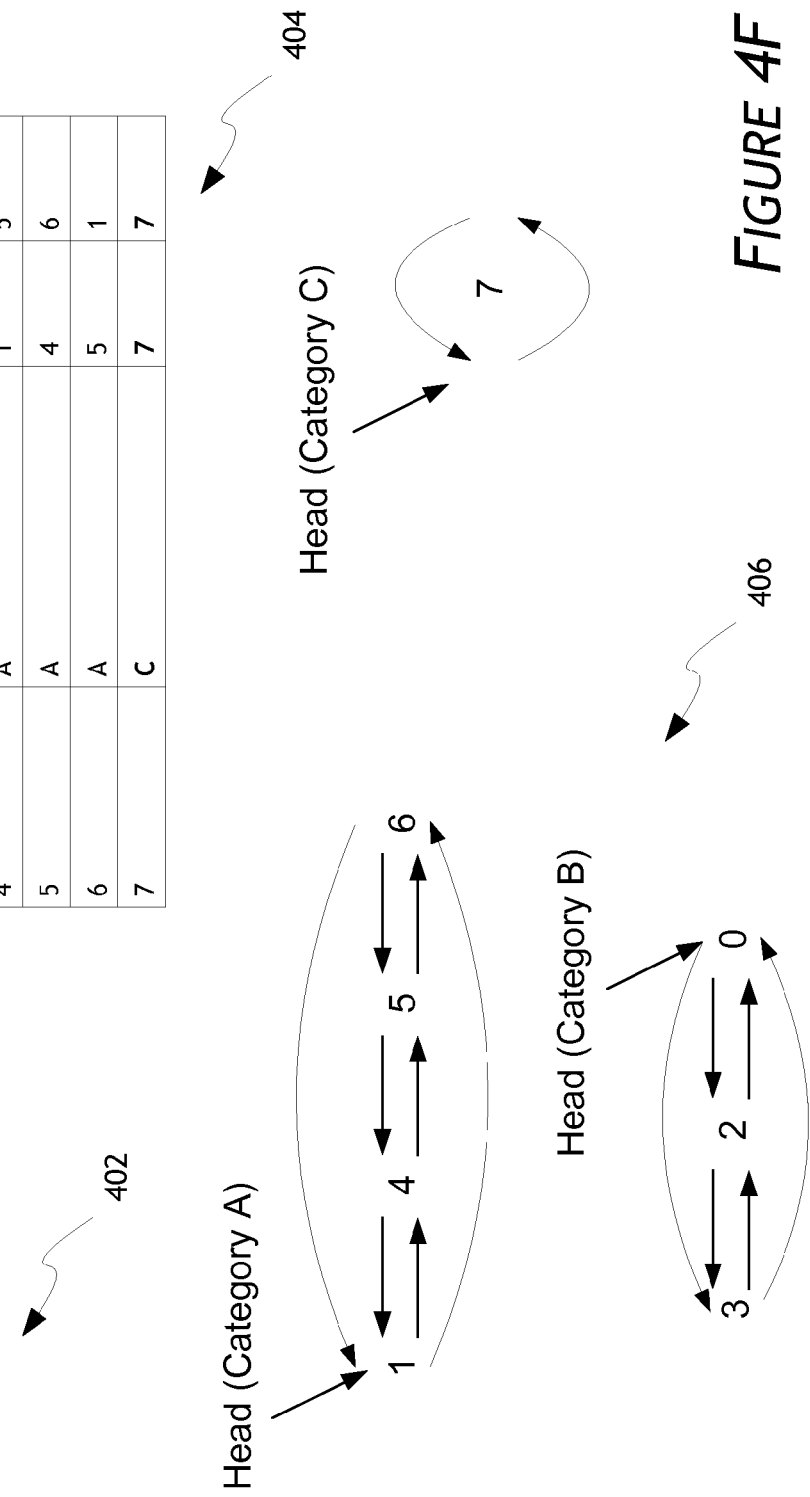

FIG. 4F shows the next additional movements as Block 7 becomes worn due to a recent erase operation and becomes eligible for the next wear level category. Block 7 is moved to Category C and becomes its new head. Subsequently, Block 6 is used in the wear leveling so the head of Category A becomes Block 1. Block 6 is selected as the least worn block for the wear leveling because it is the head of the preferred category, Category A. As shown in table 404, the pointers in Categories A, B, and C are updated to reflect the movements.

The linked lists and categories shown in FIGS. 4A-4F are for illustrative purposes only. In some embodiments, different categories may be assigned for different purposes and the categories are not required to be ranked by a particular order. For example, in one embodiment, Categories A-F may be assigned to blocks within a standard range of response/erase time while Categories G-L may be assigned to blocks outside the standard range. Although the blocks in FIGS. 4A-4F are shown to progress from Category A to Category B and then to Category C, in some embodiments blocks may be assigned to different categories apart from a consecutive progression (e.g. moving from Category A to Category F). Also, in various embodiments, blocks may be moved to a category for a lower level (e.g. moving from Category F to Category A). For example, in an embodiment where the wear level is based at least in part on the ECC, a block may be initially assigned to a category for a high wear level based on the ECC and later assigned to a category for a lower wear level due to an observed erase time that is reflective of less wear. Finally, in one embodiment, multiple preferred categories may be used.

In one embodiment where the system operation module 152 is configured to perform garbage collection, the system operation data structure 154 includes linked lists and categories that track data for garbage collection. In such an embodiment, the categories (and associated linked lists) may be assigned to different amounts of invalid data within the individual memory blocks. For example, a Category A may be assigned to blocks with less than 25% invalid data, a Category B may be assigned to blocks with at least 25% invalid data, a Category C may be assigned to blocks with at least 50% invalid data, a Category D may be assigned to blocks with at least 75% invalid data, and so on. As it is desirable to select blocks with the most invalid data for garbage collection, the preferred category in one embodiment is the category assigned to the highest amount of invalid blocks (Category D in the example above). Additionally, in one embodiment, a Category E may be used to refer to blocks with 100% invalid data and designated as the preferred category. The percentages of invalid data per block provided above are for illustrative purposes only and different percentages and/or amounts (e.g. raw number of invalid pages per block) may be used in other embodiments. In addition, the number of categories (linked lists) used may differ as well in some embodiments.

CONCLUSION

The features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A storage subsystem, comprising:
    a non-volatile solid-state memory array; and
    a system operation module for managing memory operations, the system operation module configured to:
        store system operation data associated with an internal system operation in a data structure, the data structure comprising a plurality of linked lists for storing system operation data associated with the internal system operation, at least some of the lists comprising a plurality of entries referencing blocks in the solid-state memory array belonging to a category;
        in response to detecting that a block referenced by a first entry in a first linked list has met a condition for being classified in a new category that is different from that of the blocks referenced by entries in the first linked list, remove the first entry from the first linked list, add the first entry to a second linked list comprising entries referencing blocks belonging to the new category, and designate a block referenced by a second entry as a preferred block for the internal system operation; and
        update entries within the first and second linked lists so that the dependencies in the first and second linked lists are maintained.

2. The storage subsystem of claim 1, wherein the system operation module comprises a wear leveling module for managing wear leveling memory operations and the data structure comprises a plurality of linked lists for storing wear level data.

3. The storage subsystem of claim 2, wherein each of the linked lists comprises a plurality of entries referencing blocks in the solid-state memory array belonging to a wear level category and a designated entry referencing a block to be selected in an upcoming wear leveling operation.

4. The storage subsystem of claim 3, wherein the wear leveling module is configured to select, for use in a wear leveling operation, a block referenced by the designated entry of a linked list referencing blocks belonging to a preferred category.

5. The storage subsystem of claim 4, wherein the preferred category is a category of blocks with the lowest wear level.

6. The storage subsystem of claim 3, wherein the block designated as the preferred block is a block to be selected in an upcoming wear leveling operation.

7. The storage subsystem of claim 2, wherein the category is defined by a wear level threshold and the condition comprises meeting a minimum wear level threshold.

8. The storage subsystem of claim 2, wherein the wear level of a block is a composite rating based on an erase count and an erase time.

9. The storage subsystem of claim 2, wherein the wear level of a block is based on one of an erase count and an erase time.

10. The storage subsystem of claim 1, wherein each entry comprises:
    a reference to a block within the memory array;
    a first pointer pointing to a next entry within the linked list; and
    a second pointer pointing to a previous entry within the linked list.

11. The storage subsystem of claim 10, wherein the system operation module is further configured to remove the first entry from the first linked list and add the first entry to the second linked list by updating the first and second pointers of the first entry to point to entries in the second linked list.

12. The storage subsystem of claim 1, wherein the plurality of linked lists is implemented within an array data structure.

13. The storage subsystem of claim 1, wherein the system operation module comprises a garbage collection module and the condition comprises meeting a minimum threshold of invalid pages within a block.

14. A method of managing memory operations in non-volatile solid-state memory:
    creating a plurality of linked lists for storing wear level data, at least one list comprising a plurality of entries referencing blocks in the solid-state memory assigned to a category;
    in response to detecting that a block referenced by a first entry in a first linked list has met a condition for being assigned to a new category that is different from the assigned category of the blocks referenced by entries in the first linked list, moving the first entry to a second linked list comprising entries referencing blocks assigned to the new category and designating a block referenced by a second entry as a preferred block for wear leveling; and updating entries within the first and second linked lists so that the dependencies in the first and second linked lists are preserved.

15. The method of claim 14, wherein each of the lists comprises a plurality of entries referencing blocks in the solid-state memory belonging to a wear level category and a designated entry referencing a block to be selected in an upcoming wear leveling operation.

16. The method of claim 15, further comprising selecting, for use in a wear leveling operation, the block referenced by the designated entry of a non-empty linked list referencing blocks with the lowest wear level category.

17. The method of claim 15, wherein the moving further comprises marking the first entry as the designated entry in the second linked list.

18. The method of claim 15, wherein the wear level of a block is a composite rating based on an erase count and an erase time.

19. The method of claim 15, wherein the wear level of a block is based on one of an erase count and an erase time.

20. The method of claim 14, wherein each entry comprises a reference to a block, a first pointer pointing to a next entry within the list, and a second pointer pointing to a previous entry within the list.

21. The method of claim 20, wherein the moving further comprises updating the first and second pointers of the first entry to point to entries in the second linked list.

22. The method of claim 14, wherein the linked lists are doubly linked lists.

23. The method of claim 14, wherein the plurality of linked lists is implemented within an array data structure.

24. The method of claim 14, wherein the condition comprises meeting a minimum wear level threshold.

* * * * *